(12) United States Patent
Ehmke et al.

(10) Patent No.: US 10,921,217 B2
(45) Date of Patent: Feb. 16, 2021

(54) APPARATUS AND METHOD FOR CALIBRATING AND/OR ADJUSTING A FORCE TRANSDUCER OR ACCELERATION SENSOR OF A MEASURING APPARATUS FOR DYNAMIC FORCES

(71) Applicant: SCHENCK PROCESS EUROPE GMBH, Darmstadt (DE)

(72) Inventors: Fritz Ehmke, Modautal-Luetzelbach (DE); Viktor Rais, Modautal (DE)

(73) Assignee: Schenck Process Europe GmbH, Darmstadt (DE)

(*) Notice: Subject to any disclaimer, the term of this patent is extended or adjusted under 35 U.S.C. 154(b) by 288 days.

(21) Appl. No.: 15/957,253

(22) Filed: Apr. 19, 2018

(65) Prior Publication Data

US 2018/0238771 A1    Aug. 23, 2018

Related U.S. Application Data

(63) Continuation of application No. PCT/EP2016/001725, filed on Oct. 18, 2016.

(30) Foreign Application Priority Data

Oct. 19, 2015    (DE) ..................... 10 2015 013 401.9

(51) Int. Cl.
*G01M 17/10*    (2006.01)
*B61K 9/12*    (2006.01)
(Continued)

(52) U.S. Cl.
CPC .............. *G01M 17/10* (2013.01); *B61K 9/08* (2013.01); *B61K 9/12* (2013.01); *G01L 25/00* (2013.01)

(58) Field of Classification Search
CPC .. B61K 9/08; B61K 9/12; G01L 25/00; G01L 1/22; G01M 17/10; G01G 23/01
(Continued)

(56) References Cited

U.S. PATENT DOCUMENTS 3,718,040 A * 2/1973 Freeman ................. G01L 5/161
73/146
4,481,596 A * 11/1984 Townzen ............... G01K 7/021
702/99

(Continued)

FOREIGN PATENT DOCUMENTS

DE    44 39 342 A1    5/1996
DE    102 41 320 A1    3/2004
(Continued)

*Primary Examiner* — John Fitzgerald
*Assistant Examiner* — Truong D Phan
(74) *Attorney, Agent, or Firm* — Muncy, Geissler, Olds & Lowe, P.C.

(57) ABSTRACT

An apparatus and method for calibrating and/or adjusting a force transducer or accelerator sensor of a measuring apparatus. The apparatus including a force spring element fixedly connectable to the measuring apparatus, a mass body movable along a guide relative to the force application element and a reference force transducer or reference acceleration sensor arranged between the force application element and the mass body. A positive or negative acceleration is applied to the mass body and the reaction forces resulting from the acceleration of the mass body are applied to the force-application element and, additionally, to the force transducer or acceleration sensor in the measuring apparatus. Values determined by the reference force transducer or reference acceleration sensor and the values determined by the force transducer or acceleration sensor in the measuring apparatus are recorded, processed and compared.

14 Claims, 3 Drawing Sheets

(51) Int. Cl.
 *B61K 9/08* (2006.01)
 *G01L 25/00* (2006.01)

(58) Field of Classification Search
 USPC .......................................................... 73/1.15
 See application file for complete search history.

(56) References Cited

U.S. PATENT DOCUMENTS

| | | | |
|---|---|---|---|
| 5,492,002 A | 2/1996 | Higgins et al. | |
| 9,103,851 B2* | 8/2015 | Brucke | G01P 21/00 |
| 2008/0177358 A1* | 7/2008 | Gammons | A61F 7/02 |
| | | | 607/96 |
| 2010/0004876 A1* | 1/2010 | Loher | G01G 23/01 |
| | | | 702/41 |
| 2010/0035727 A1* | 2/2010 | Brunner | A61B 5/1038 |
| | | | 482/8 |
| 2012/0035869 A1* | 2/2012 | Lin | G01D 3/022 |
| | | | 702/57 |
| 2013/0090880 A1* | 4/2013 | Sato | B25J 9/1682 |
| | | | 702/98 |
| 2016/0107316 A1* | 4/2016 | Alt | B25J 9/1697 |
| | | | 700/259 |

FOREIGN PATENT DOCUMENTS

| | | | | |
|---|---|---|---|---|
| DE | 103 15 666 A1 | 11/2004 | | |
| DE | 10 2004 012 169 | 10/2005 | | |
| DE | 10 2015 013 401 B3 | 3/2017 | | |
| EP | 1 839 990 A2 | 10/2007 | | |
| ES | 2435506 A2 * | 12/2013 | | G01M 17/10 |
| ES | 2435509 A2 | 12/2013 | | |
| WO | WO 01/17837 A1 | 3/2001 | | |

\* cited by examiner

APPARATUS AND METHOD FOR CALIBRATING AND/OR ADJUSTING A FORCE TRANSDUCER OR ACCELERATION SENSOR OF A MEASURING APPARATUS FOR DYNAMIC FORCES

This nonprovisional application is a continuation of International Application No. PCT/EP2016/001725, which was filed on Oct. 18, 2016, and which claims priority to German Patent Application No. 10 2015 013 401.9, which was filed in Germany on Oct. 19, 2015, and which are both herein incorporated by reference.

BACKGROUND OF THE INVENTION

Field of the Invention

The present invention relates to an apparatus for calibrating and/or adjusting a force transducer or acceleration sensor of a measuring apparatus for dynamic forces and a method for calibrating and/or adjusting a force transducer or acceleration sensor of a measuring apparatus for dynamic forces.

Description of the Background Art

When crossing a railroad track, the wheels of rail vehicles bring on rail stress, which include a static load component, which is mainly a result of the vehicle weight, and a dynamic load component which can be traced back to a pulse-like application of force. What causes the dynamic load component are often geometric inaccuracies of the vehicle wheels that are initially present, such as eccentricity of the wheels or eccentricities above the wheel circumference, or signs of wear such as, for example, flattenings or wheel flats on the tread. Further influences on the dynamic forces can also be locally defective elastic ballast of the track in the track support body.

Due to higher and higher speeds of rail vehicles and the direct influence of the vehicle speed on the dynamic load component, there is an increase in wear and risk of damage to parts of the vehicle and railroad tracks, and in the deterioration of riding comfort. It is therefore in the interest of the operators and users of railroad tracks to keep operating stress as low as possible and to identify and eliminate possible causes of unusual peak loads early.

For detecting eccentricities and wheel flats on rail vehicle wheels, a measuring and diagnostic apparatus has proven itself in practice, as described in WO 01/17837 A1, which is incorporated herein by reference. There, a measuring section is described whose crossties have recesses into which force sensors are inserted. The force sensors support a track section so that when crossing the measuring section, the wheel contact forces are detected by the load cells and are transmitted to an analysis unit. Using the deviation from an average value or a reference force curve of the force curve that is detected in the analysis unit, conclusions can be drawn about eccentricities and wheel flats on the vehicle wheels.

In the manufacture and/or assembly of such apparatuses as well as during their operation, interfering influences on the measuring process cannot be ruled out. In order to obtain meaningful and reliable values, it is therefore imperative to calibrate and/or adjust the apparatus before commissioning, and subsequently at regular intervals. However, the apparatuses and methods available for this purpose are limited to calibrating and/or adjusting the measuring or diagnostic apparatus statically or quasi-statically, and the influence of the dynamic force component is not taken into consideration.

SUMMARY OF THE INVENTION

It is therefore an object of the invention is to achieve a more precise calibration and/or adjustment of a force transducer or acceleration sensor of a measuring apparatus for dynamic forces and, in particular, for diagnostic apparatuses for rail vehicles.

The basic idea of the invention is to apply a defined and reproducible dynamic force in the region of a measuring section on the measuring or diagnostic apparatus there, whose signals detected in a reference force transducer produce a reference force signal curve, and whose signals detected in a force transducer of the measuring or diagnostic apparatus yield an associated force signal curve. A comparison and analysis of the reference force signal curve and the force signal curve allows for dynamic calibrating and/or adjusting of the force transducer or acceleration sensor of the measuring or diagnostic apparatus.

Since the basis for an inventive calibrating and/or adjusting is applying a dynamic force to a force transducer or acceleration sensor of a measuring and diagnostic apparatus, it is possible for the first time, as compared to the prior art, to consider the dynamic force component in the calibrating and/or adjusting and thus realistically reflect the force conditions actually occurring.

It proves to be an advantage that for calibrating and/or adjusting, the force signal curve of the reference force transducer and force transducer of the measuring apparatus detected over time is available. When comparing the force signal curve with the reference force signal curve, several significant points, curve sections or characteristics of the signal curves can thus be taken into account, such as maximum and minimum values, gradients, mean values, identification of impulse by means of integral forming, etc., resulting in higher precision and safety in the calibrating and/or adjusting.

Preferred is the use of a calibrated reference force transducer within an apparatus according to the invention so that the signal curves obtained from the reference force transducer can be traced back.

Further, it is possible to design the reference force signal curve by using suitable parameters when applying the dynamic force in such a way that it corresponds to the signal curve which is typical for the passage of a defective vehicle wheel over the measuring path. Suitable for this purpose are spring units or actuators, with which the dynamic force path can be controlled. In this way, the calibrating and/or adjusting are based on realistic dynamic force conditions, which further improves precision and safety of the calibrated and/or adjusted force transducer or acceleration sensor of the measuring apparatuses.

Analyzing force signal curves also opens up the possibility of recognizing inhomogeneous elastic ballast of the track in the region of the measuring and diagnostic apparatus. Thus, if the ballast of the track is too soft, the dynamic force leads to a weak force signal of the force transducer in the measuring or diagnostic apparatus; a hard track bed, however, creates a stronger response signal.

An apparatus according to the invention is initially distinguished by its high mobility. This is due to a simple and compact construction of the apparatus as well as the largely self-sufficient operation of the apparatus, optionally combined with the disassembly into separate functional components. In this way, the apparatus can be stowed very tightly, so that a commercial vehicle is sufficient for transport. Thus, different locations can be reached quickly and independently, even if they are remote. For the final distance to the site, it is even possible to carry the apparatus or its individual components by hand, for which one person is sufficient.

The inventive construction of an apparatus according to the invention also allows for the simple and quick installation on the measuring apparatus that is to be tested, i.e. an expeditious implementation within the measuring section as well as the rapid execution of the measuring cycles. Within a very short time, the operational readiness of the apparatus is reached and the calibrating and/or adjusting process is completed, which turns out to be a great advantage in terms of the road closures and associated impairments of rail transport that are necessary when conducting the measurements.

To implement the invention, simple embodiments provide that for producing an impulse, a mass body of predetermined weight is guided from a defined height, solely driven by its weight, against a rigid stop coupled to the measuring apparatus; in this case, the mass body experiences a negative acceleration by the sudden braking at the stop. The movement of the mass body can be effected quasi in freefall along vertical linear guides or guided by a pivot arm along a circular track. In both cases, the impact causes an impulse which generates the reference force signal curve in the area in front of the measuring apparatus, as well as the force signal curve in the area of the measuring apparatus, both of which serve as the basis for calibrating and/or adjusting. The advantage of such embodiments is that a drive for accelerating the mass body is dispensable so that the apparatus can be operated largely autonomously.

The mass body can be positively accelerated from a rest position. For this purpose, an actuator interposed between measuring apparatus and mass body is activated, which is force-coupled both with the mass body and the measuring apparatus. Due to inertia, the actuator accelerating the mass body causes reaction forces which act on the measuring apparatus. It proves to be an advantage that the actuator programmatically follows a predetermined path-time diagram so that the reference force signal curve can be set as desired.

In this context, linear actuators, such as cylinder piston units, spindle drives, pneumatic drives or drive forces from combustion processes have proven particularly advantageous since their direction of force is clearly defined and may advantageously be reconciled with the actual load from the vehicle operation.

In terms of easier handling, the mass body is light enough that it can be easily carried by hand, which is readily possible up to about 25 kg of weight. If heavier mass bodies must be used, the mass body can be constructed in several parts, wherein each part does not exceed a given weight. The parts can then be assembled to form the mass body at the operating site.

In particular in embodiments with actuators, mass bodies can be used which cannot be manually handled due to their large mass. Thus, in the context of the invention, a rail vehicle is also used as a mass body, which forms the counter bearing for the actuator. This has the advantage that a calibrating and/or adjusting takes place with simultaneous consideration of both static and dynamic load components.

A spring unit can be arranged between the measuring apparatus and the mass body, which opposes the applied dynamic force and therefore influences the force reference signal curve. By selecting appropriate spring constants, the reference force signal curves can be adapted to specific requirements. Thus, with great spring constants, a signal curve with large amplitudes and large flank gradients is created, while with small spring constants, a moderate and balanced signal curve occurs.

For example, the spring unit can comprise a plurality of spring elements such as disk springs, which can be arranged in the spring unit in parallel and/or in series to obtain the desired spring constant of the spring unit.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
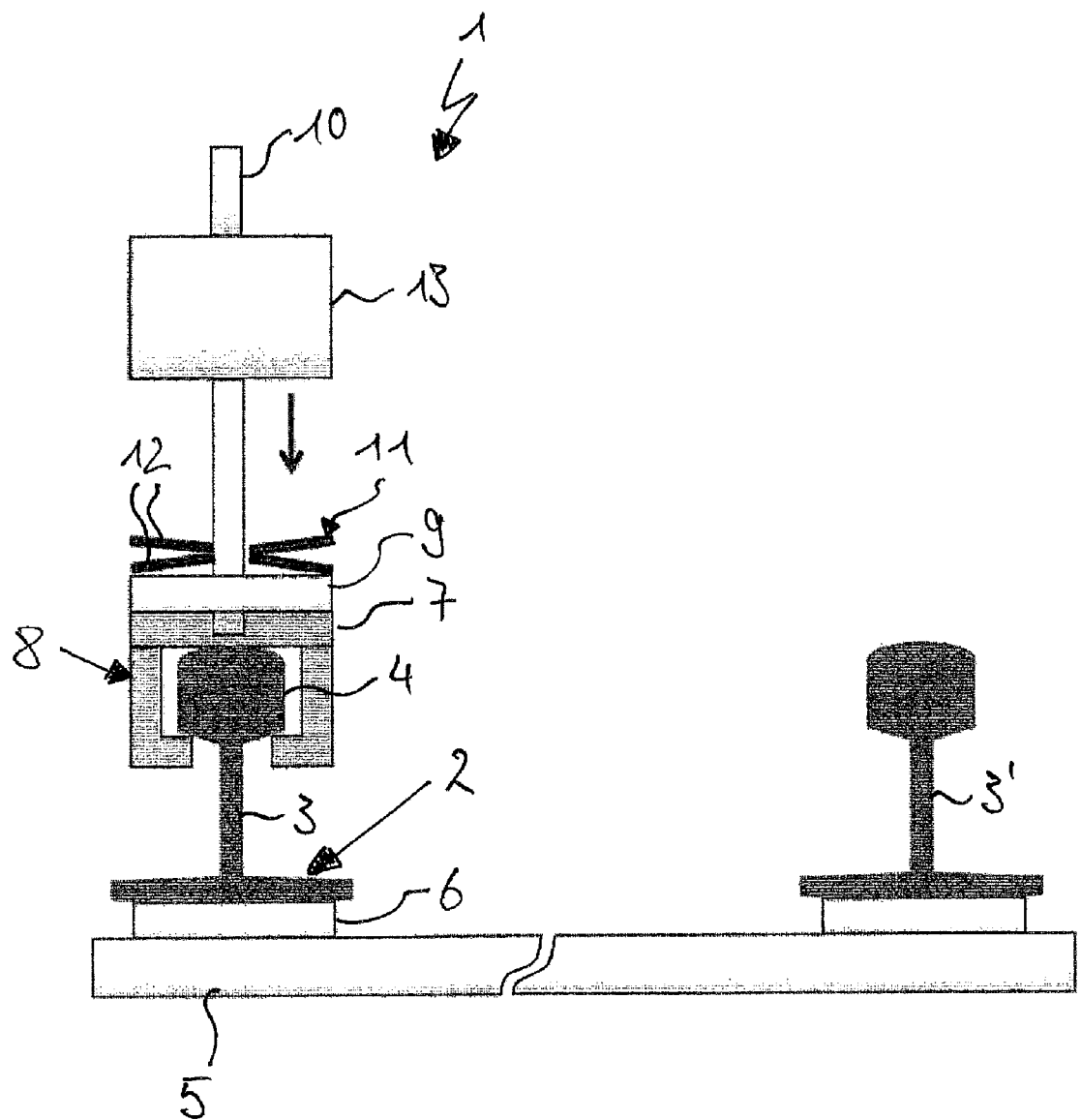
FIG. 1 is a section through a measuring or diagnostic apparatus.
Figure 2:
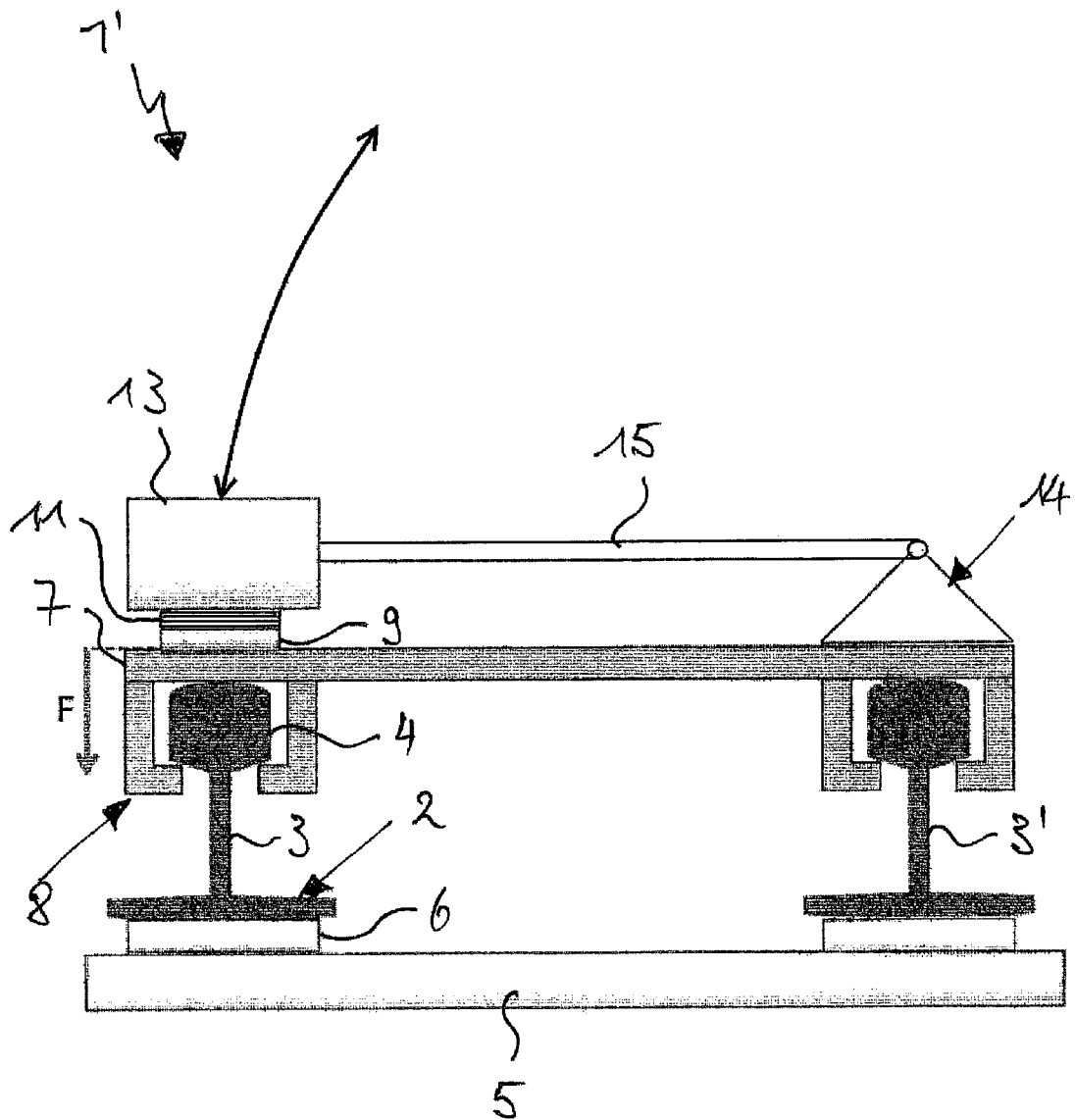
FIG. 2 is a section through a measuring or diagnostic apparatus.
Figure 3:
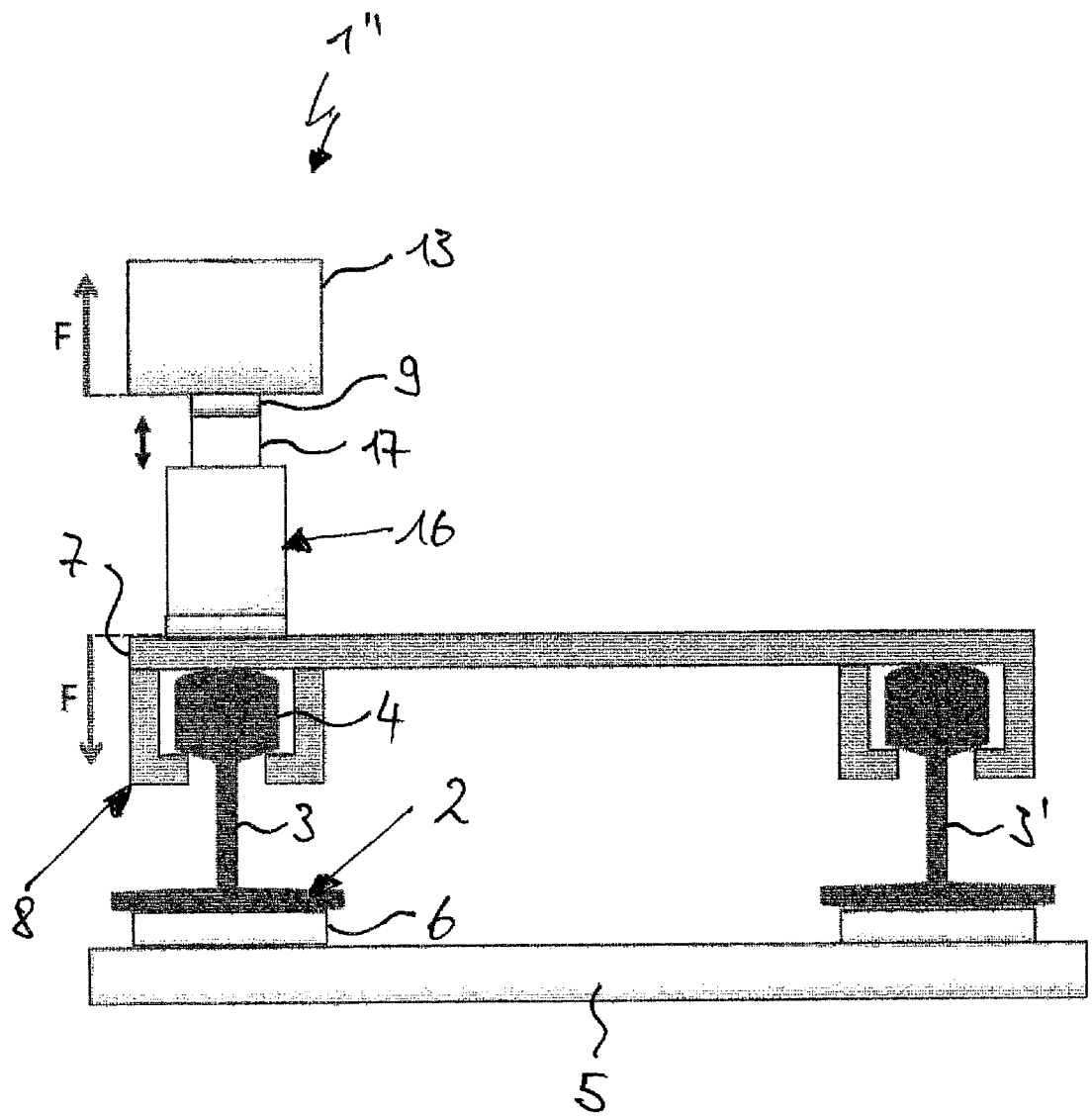
FIG. 3 is a section through a measuring or diagnostic apparatus.

FIGS. 1 to 3 show exemplary embodiment of the inventive apparatus 1, 1', 1", which are in each case intended for calibrating and/or adjusting a force transducer 6 or acceleration sensor of a measuring or diagnostic apparatus 2.

The measuring or diagnostic apparatus 2 is integrated into a track as part of a measuring section. For example, the measuring section may be formed by a number of measuring fields aligned in the rail direction, wherein a measuring or diagnostic apparatus 2 represents a measuring field and extends over a rail section of two crossties. The sectional representations displayed in FIGS. 1 to 3 correspond to the area between two crossties.

The measuring or diagnostic apparatuses 2 according to FIGS. 1 to 3 each comprise a measuring rail 3, which with their rail head 4 bear an apparatus 1, 1', 1" according to the invention. The ends of a measuring rail 3 are each supported in the range of a crosstie 5, where the rail base is supported on a force transducer 6 that is mounted in the crosstie 5.

FIG. 1 relates to an embodiment of an apparatus 1 according to the invention for calibrating and/or adjusting a force transducer 6 or acceleration sensor of the measuring or diagnostic apparatus 2. The apparatus 1 comprises a plate-shaped force application element 7, which rests with its underside in direct contact on the rail head 4 of the measuring rail 3. By means of a holding device 8, whose clamping jaws engage behind the rail head 4 on its bottom side, the force application element 7 is clamped against the rail head 4, which guarantees both a secure seat of the apparatus 1 on the measuring or diagnostic apparatus 2, as well as a complete transmission of the impulse from the force application element 7 into the measuring rail 3.

On the upper side of the force application element 7, in turn, a reference force transducer 9 is arranged, which is rigidly connected via a connector to the force application element 7. Starting from the upper side of the reference force transducer 9, a linear guide extends in the vertical direction, which is embodied in the present embodiment by a central guide rod 10, and which may have, for example, a length in a range between 50 cm and 100 cm.

Loosely enclosing the guide rod 10 and seated on the reference force transducer 9 is a spring unit 11, which is effective in the vertical direction. Without limitation, in the present case, two series-connected disk springs 12 form the spring unit 11. By means of a suitable number, selection and arrangement of the spring elements, the spring constant of the spring unit 11 can be adjusted, for example, in a range between 10 kN/mm and 200 kN/mm.

Finally, as an essential element of the invention, a mass body 13 can be seen in FIG. 1, which is disposed freely displaceable in both directions within the apparatus 1 along the guide rod 10. The mass body 13, which can be made of steel, advantageously has a cylindrical shape with a through-bore in the region of its longitudinal axis, within which the guide rod 10 runs.

For calibrating and/or adjusting the force transducer 6 or acceleration sensor of the measuring or diagnostic apparatus 2, the mass body 13 is raised along the guide rod 10 up to a predetermined height of fall, for example, to a meter, and then suddenly released. Due to the weight force, the mass body 13 moves downward, first meets the spring unit 11, which counteracts the movement of the mass body 13, and then meets the reference force transducer 9, which records the dynamic impulse exerted by the mass body 13 over time and transmits it to an analysis unit, not further shown. Based on these values, a reference force signal curve is generated.

Simultaneously, the impulse from the reference force transducer 9 is introduced into the force application element 7, which in this manner forms an indirect stop for the mass body 13. Via the force application element 7, the impulse is introduced in the measuring rail 3 and in addition, in the force transducer 6 of the measuring or diagnostic apparatus 2. The impulse signal generated there is also transmitted to the analysis unit and generates a force signal curve therefrom. For calibrating and/or adjusting, the two signal curves are compared and evaluated.

Ideally, the reference force signal curve and force signal curve are identical with respect to amplitude and waveform, which means that the deviation is equal to zero and an adjustment is unnecessary.

However, if differences are detected, for example, in that the maximum amplitudes differ, then the deviation should be noted as a result of the calibration, and if needed, an adjustment of the force transducer 6 or acceleration sensor of the measuring or diagnostic apparatus 2 should be made in accordance with the amount of deviation.

The inventive apparatus 1' according to FIG. 2 is based on the same operating principle as described above, namely to simulate a dynamic load drop by abrupt braking of a falling mass body against a stop. There is conformity with the embodiment described in FIG. 1 in respect of the measuring or diagnostic apparatus 2 as well as the fastening of a force application element 7, which serves as a stop for the mass body 13 on the measuring rail 3 by means of a holding device 8, and the reference force transducer 9 and spring unit 11 disposed on the force application element 7, so that what has been said there applies.

Differences exist in the nature of the guidance of the mass body 13 toward the force application element 7. In the embodiment according to FIG. 2, a stationary pivot bearing 14 is arranged on the second rail 3' of the track running parallel to the measuring rail 3, to which one end of a pivot arm 15 is articulated. The other end of the pivot arm 15 is rigidly connected to the mass body 13.

In order to generate a dynamic force, the mass body 13 is swiveled as needed about the pivot bearing 14 upwards, for example, until the mass body 13 has assumed a position above the pivot bearing 14. By initiating a movement in the direction of the measuring or diagnostic apparatus 2, the mass body 13 further accelerates freely on the circular path, which is predetermined by the pivot bearing 14, and the pivot arm 15, until it finally abuts indirectly on the force application element 7 via the spring unit 11 and the reference force transducer 9. The reference force signal curve and force signal curve resulting from the impulse, as well as their analysis for calibration and, if necessary, adjustment of the force transducer 6 or acceleration sensor of the measuring and diagnostic apparatus 2, correspond to the one described in FIG. 1.

FIG. 3 illustrates an exemplary embodiment of the invention, in which to generate a dynamic force, a mass body 13 is accelerated from a rest position, and the resulting acceleration forces or reaction forces are used as an impulse. The measuring or diagnostic apparatus 2 with the force application element 7 tensioned against the measuring rail 3 in turn correspond to those described in FIGS. 1 and 2.

An actuator is supported against the force application element 7, the former being embodied in the present embodiment by a hydraulically driven cylinder piston unit 16, but which could also be composed of a spindle drive or pneumatic drive, or the like. The displaceable piston 17 of the cylinder piston unit 16 is connected with the interposition of a reference force transducer 9 to the mass body 13, in a manner transmitting tensile and compressive force.

By suitable pressure and thus actuation of the cylinder piston unit 16, forces are created during acceleration that, as previously described in FIGS. 1 and 2, are recorded in the reference force transducer 9 and force transducer 6 of the measuring or diagnostic apparatus 2 and are forwarded to an analysis device. In this case, it is possible to apply not only compressive forces to the force transducer 6, 9, but also tensile forces by retracting the piston 17 into the cylinder piston unit 16, in order to simulate for example an initial load relief for the rail before the occurrence of the dynamic force.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus for calibrating and/or adjusting a force transducer or acceleration sensor of a measuring apparatus for dynamic forces that is integrated into a measuring section of a rail track, the apparatus comprising:
   a force application element fixedly connectable with the measuring apparatus;
   a mass body movable along a guide relative to the force application element;
   a reference force transducer or reference acceleration sensor arranged between the force application element and the mass body, wherein a positive or negative acceleration is applied to the mass body, wherein, due to the acceleration of the mass body, reaction forces are introduced into the force application element and into the force transducer or acceleration sensor of the measuring apparatus; and an analysis device for recording, processing and comparing values determined by the reference force transducer or reference acceleration sensor and by the force transducer or acceleration sensor of the measuring apparatus, wherein the force application element is part of a holding device with which the apparatus is tensioned against the measuring apparatus, and wherein the holding device clamps around a rail head of the rail track, such that the force application element rests on top of the rail head.

2. The apparatus according to claim 1, wherein the reference force transducer or reference acceleration sensor is directly arranged on the force application element, so that the reaction forces indirectly act via the reference force transducer on the force application element.

3. The apparatus according to claim 1, wherein the guide is a linear guide or a pivot guide.

4. The apparatus according to claim 1, wherein the guide is a pivot guide, the pivot guide including a pivot bearing that is positioned on top of the force application element, wherein a first end of a pivot arm is attached to the pivot bearing and a second end of the pivot arm is attached to the mass body.

5. The apparatus according to claim 1, wherein the reference force transducer is arranged directly on the mass body.

6. The apparatus according to claim 1, wherein a stop against which the mass body, which is moved at a predetermined speed, is guided applies the negative acceleration.

7. The apparatus according to claim 6, wherein the stop is the force application element.

8. The apparatus according to claim 1, wherein an actuator applies the positive acceleration, the actuator being arranged between the force application element and the mass body, and wherein the actuator causes the mass body to be accelerated from a rest position.

9. The apparatus according to claim 8, wherein the actuator is a linear drive, a cylinder piston unit, a spindle drive, a pneumatic drive or a combustion process.

10. The apparatus according to claim 8, wherein the mass body is a rail vehicle.

11. The apparatus according to claim 1, wherein a spring unit is arranged between the force application element and the mass body so that the reaction forces indirectly act on the force application element via the spring unit.

12. The apparatus according to claim 11, wherein the spring unit is arranged directly on the reference force transducer, so that the reaction forces indirectly act on the force application element via the spring unit and the reference force transducer.

13. The apparatus according to claim 11, wherein the spring unit comprises at least one disk spring.

14. A method for calibrating and/or adjusting a force transducer or acceleration sensor of a measuring apparatus for dynamic forces that is integrated into a measuring section of a rail track for rail vehicles, the method comprising:

introducing a dynamic force in the measuring apparatus via an apparatus comprising a force application element fixedly connectable with the measuring apparatus, a mass body that is movable along a guide relative to the force application element and a reference force transducer or reference acceleration sensor that is arranged between the force application element and the mass body, wherein the introducing of the dynamic force includes applying a positive or negative acceleration to the mass body, such that reaction forces are introduced into the force application element by the reference force transducer or reference acceleration sensor and are introduced into the force transducer or acceleration sensor of the measuring apparatus by the force application element, wherein the force application element is part of a holding device with which the apparatus is tensioned against the measuring apparatus, and wherein the holding device clamps around a rail head of the rail track, such that the force application element rests on top of the rail head;

recording a reference force signal curve as a result of the reaction forces via the reference force transducer or reference acceleration sensor;

recording a force signal curve as a result of the reaction forces via the force transducer or acceleration sensor of the measuring apparatus; and analyzing the recorded reference force signal curve and the force signal curve by carrying out a comparison.

* * * * *